Nov. 1, 1938.　　　J. H. ESTERS　　　2,134,866
CAR BODY
Filed June 18, 1937　　3 Sheets-Sheet 2
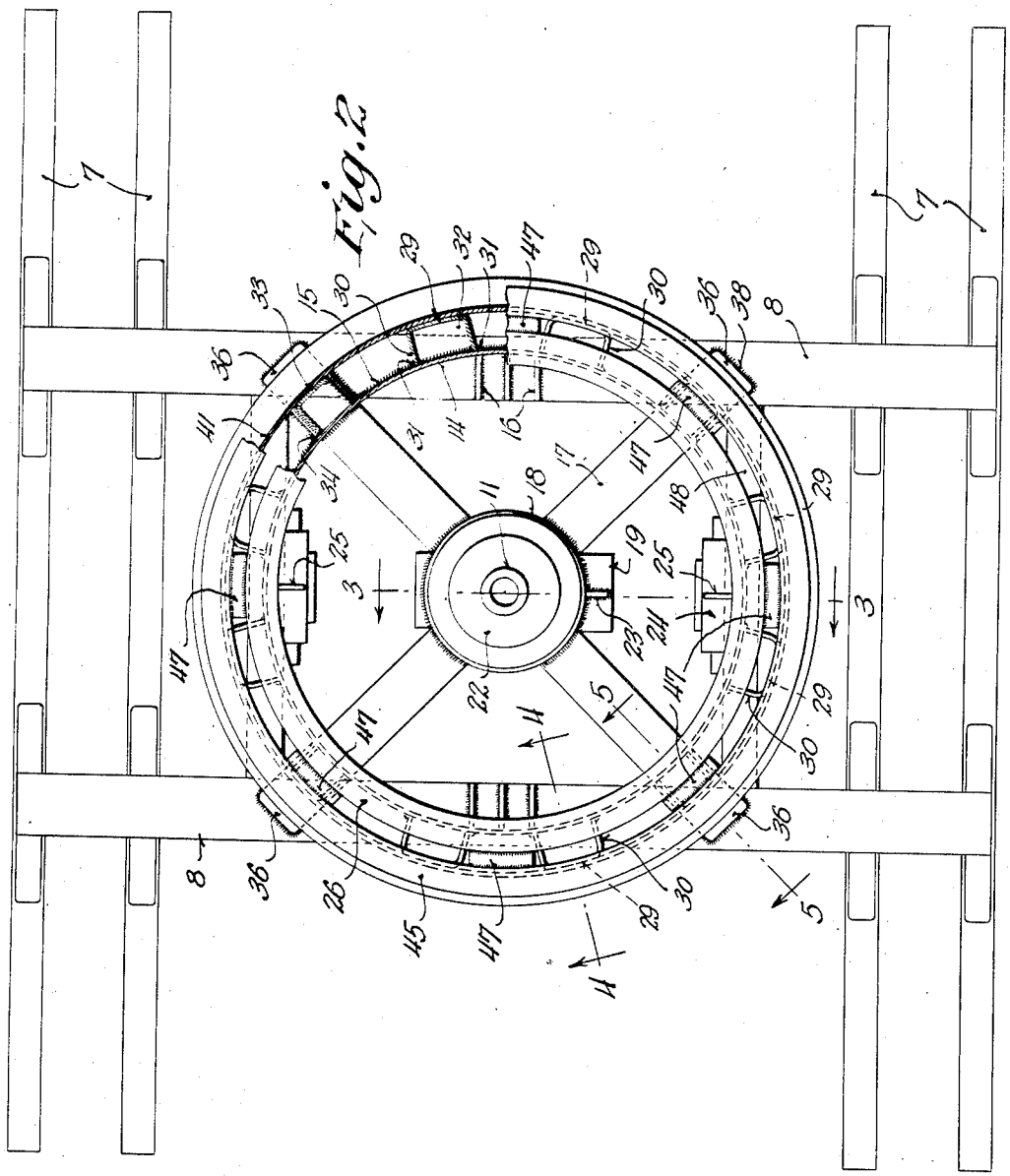

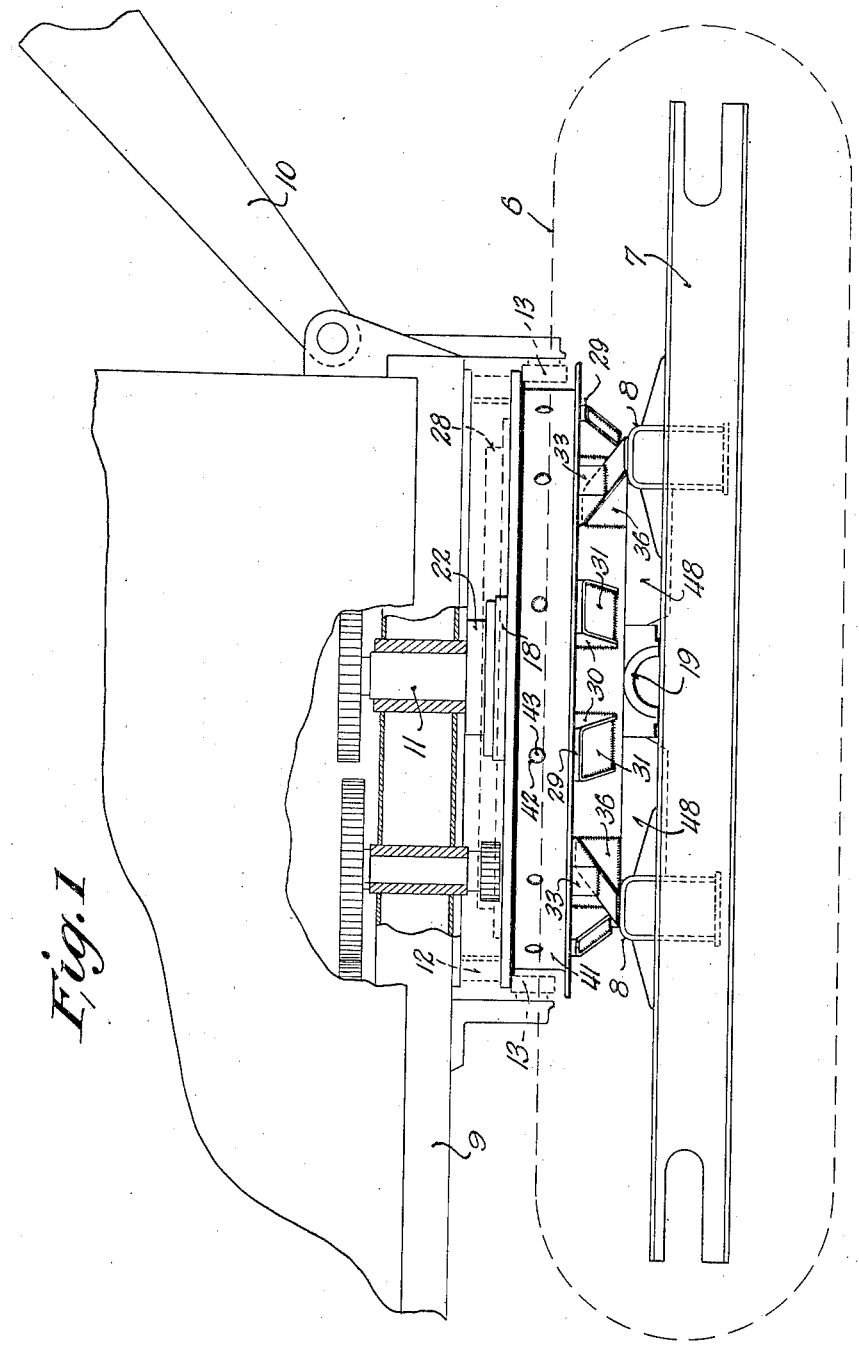

Nov. 1, 1938.  J. H. ESTERS  2,134,866
CAR BODY
Filed June 18, 1937  3 Sheets-Sheet 3
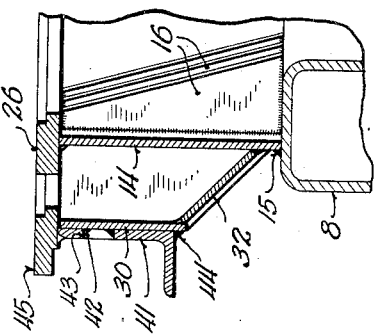
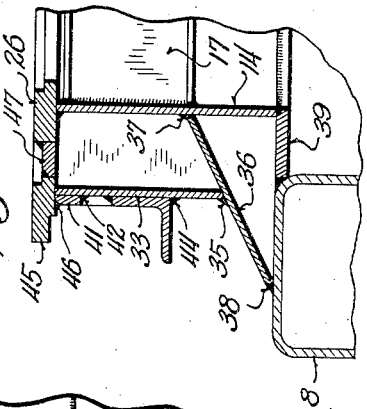
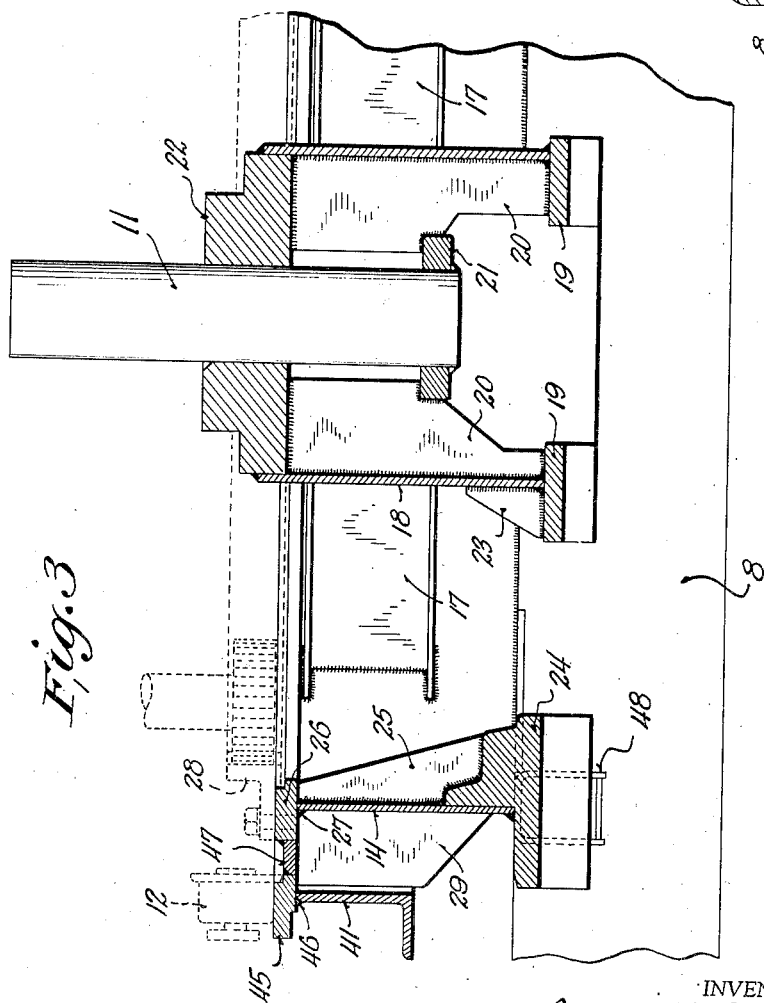
INVENTOR.
Joseph H. Esters
BY Quarles & French
ATTORNEYS Patented Nov. 1, 1938

2,134,866

UNITED STATES PATENT OFFICE 2,134,866

CAR BODY

Joseph H. Esters, Milwaukee, Wis., assignor to Harnischfeger Corporation, Milwaukee, Wis., a corporation of Wisconsin Application June 18, 1937, Serial No. 148,833

4 Claims. (Cl. 212—69)

The invention relates to supporting structures for endless tread propelled types of material-handling equipment and more particularly to a novel form of tractor base or car body composed entirely of rolled or forged or high tensile strength elements united by welding.

The usual tractor bases for equipment of the type above described are formed of massive castings made from iron or steel and are characteristically heavy and composite structures united by bolting, riveting, and the like have not materially reduced the weight.

The supporting structure of this invention, however, is composed entirely of rolled or forged standard steel sheets or shapes of consequently high tensile strength, the structure being united by welding. Strength through sheer massiveness of design is avoided, and strength is obtained by proper disposition of high tensile strength material. In the application of Walter Harnischfeger, Serial No. 119,947, filed January 11, 1937, an excavator base formed of welded parts is disclosed, and the present invention is a modification thereof whereby the addition of an outer ring structure thereto greatly reinforces the car body and permits its use on equipment of considerably greater capacity with only a slight increase in weight and cost of production.

The invention further consists in the several features hereinafter set forth and more particularly defined by claims at the conclusion hereof.

In the drawings:

Fig. 1 is a side elevation, partly in section, showing a car body embodying the invention;

Fig. 2 is a plan view thereof, parts being broken away and parts being shown in section;

Fig. 3 is a detail sectional view taken on the line 3—3 of Fig. 2;

Fig. 4 is a detail sectional view taken on the line 4—4 of Fig. 2;

Fig. 5 is a detail sectional view taken on the line 5—5 of Fig. 2;

In Fig. 1 the appurtenances and structure of a rotating base, material handling machine are shown in light lines, together with the structure of this invention in heavier lines, so that the relation of the car body to the other parts of the apparatus may be clearly understood. In this figure the endless tread 6 is shown in dotted lines, and in Figs. 1 and 2 the numeral 7 designates the longitudinal frame members for the tread structures which are here shown connected together by transverse axle frame members 8. The car body embodying the invention is mounted on the axles 8, and the rotating base 9 having the boom 10 pivotally supported thereon is mounted to rotate about the central pivot 11 of the car body and has supporting rollers 12 and stabilizing rollers 13 associated with it.

The car body includes as a base structure the rolled steel ring 14 which is secured by welding at 15 to the axles 8, as shown in Fig. 4, and also by welding to brace members 16 at this point which brace members are likewise welded at their bases to the axles. The ring 14 also has the outer end of I-beams or spokes 17 welded thereto, the inner ends of said beams being welded to a drum or inner ring member 18 which is welded to a bearing member 19 and to radially disposed ribs 20 to which a pintle or pivot pin base ring 21 is welded, the pivot pin or sleeve 11 being welded at its lower end to said ring 21 and extending through an annular foot member 22 which is welded to the upper end of the ring 18 and to the tops of the ribs 20. A reinforcing gusset 23 may also be welded to the ring 18 and one of the members 19. The ring 14 also has spaced bearing members 24 welded thereto and alined with the bearing portions of the members 19 for receiving the drive shafts (not shown) for the treads. These bearing members are braced by gussets 25 welded to them and to the ring 14. A steel annulus or flat ring 26 formed from rolled steel which forms the track of the structure of the prior application is secured by welding at 27 to the top of the ring 14. This ring is used as a support for the annular gear 28 forming part of the swing gear for the rotating base 9.

A plurality of U-shaped pad members 29 have their legs 30 welded as at 31 to the outer side of the ring 14 and their lower ends closed by bottom plates 32 welded to them and to the ring 14. Other U-shaped pad members 33 have their legs welded at 34 to the outer side of the ring 14 and are welded at their lower ends at 35 to angled foot members 36 which are welded to the ring 14 at 37 and to the axles 8 at 38. At these points the structure is further braced by plates 39 welded, as shown in Fig. 5, to the axle and to the ring 14.

A rolled steel ring 41 of angled cross-section is welded to the webs of the pad members 29 and 33 by plug type welds at 42, wherein the welding metal connects said pad members with the sides of openings 43 formed in the ring, and by welding 44 to said spaced members.

A turntable track or ring 45 of rolled steel is welded at 46 to the top of the ring 41 and is spaced from the ring 26 by sector-shaped spacer blocks 47 welded at their edges to the adjacent rings. The rollers 12 and 13 run on the upper and lower track faces provided on the ring 45.

Channel-shaped braces 48 may be welded to the bearing members 24 and the axles 8.

All of the welds above described and illustrated in the drawings are preferably made by means of conventional arc welding. However, arc, torch, or spot welding, or other suitable welding may be employed to effect assembly without departing from the broad principles of the structure of this invention.

I desire it to be understood that this invention is not to be limited to any particular form or arrangement of parts except in so far as such limitations are included in the claims.

What I claim as my invention is:

1. In a car body for rotating base type machines, the combination with axle frame members, a ring mounted upright on and welded to said frame members, a pintle for the rotating base, and means for supporting said pintle centrally of said ring, of a plurality of radially disposed pad members welded to said ring, an outer ring member welded to said pad members, and an annular turntable track welded to said outer ring member.

2. In a car body for rotating base type machines, the combination with axle frame members, a ring carried by said frame members, a pintle for the rotating base, and means for supporting said pintle centrally of said ring, of a plurality of U-shaped pad members having their legs welded to the outer side of said ring, an outer ring member welded to said pad members, and an annular turntable track welded to said outer ring member.

3. In a car body for rotating base type machines, the combination with axle frame members, a ring mounted upright on and welded to said frame members, a pintle for the rotating base, means for supporting said pintle centrally of said ring, and a top ring welded to said first named ring, of a plurality of radially disposed pad members welded to said first named ring, an outer ring member welded to said pad members, and an annular turntable track welded to said outer ring member.

4. In a car body for rotating base type machines, the combination with axle frame members, a ring mounted upright on and welded to said frame members, a pintle for the rotating base, means for supporting said pintle centrally of said ring, and a top ring welded to said first named ring, of a plurality of radially disposed pad members welded to said first named ring, an outer ring member welded to said pad members, an annular turntable track welded to said outer ring member, and spacer members connected by welding to said track and top ring.

JOSEPH H. ESTERS.